Patented Oct. 17, 1944

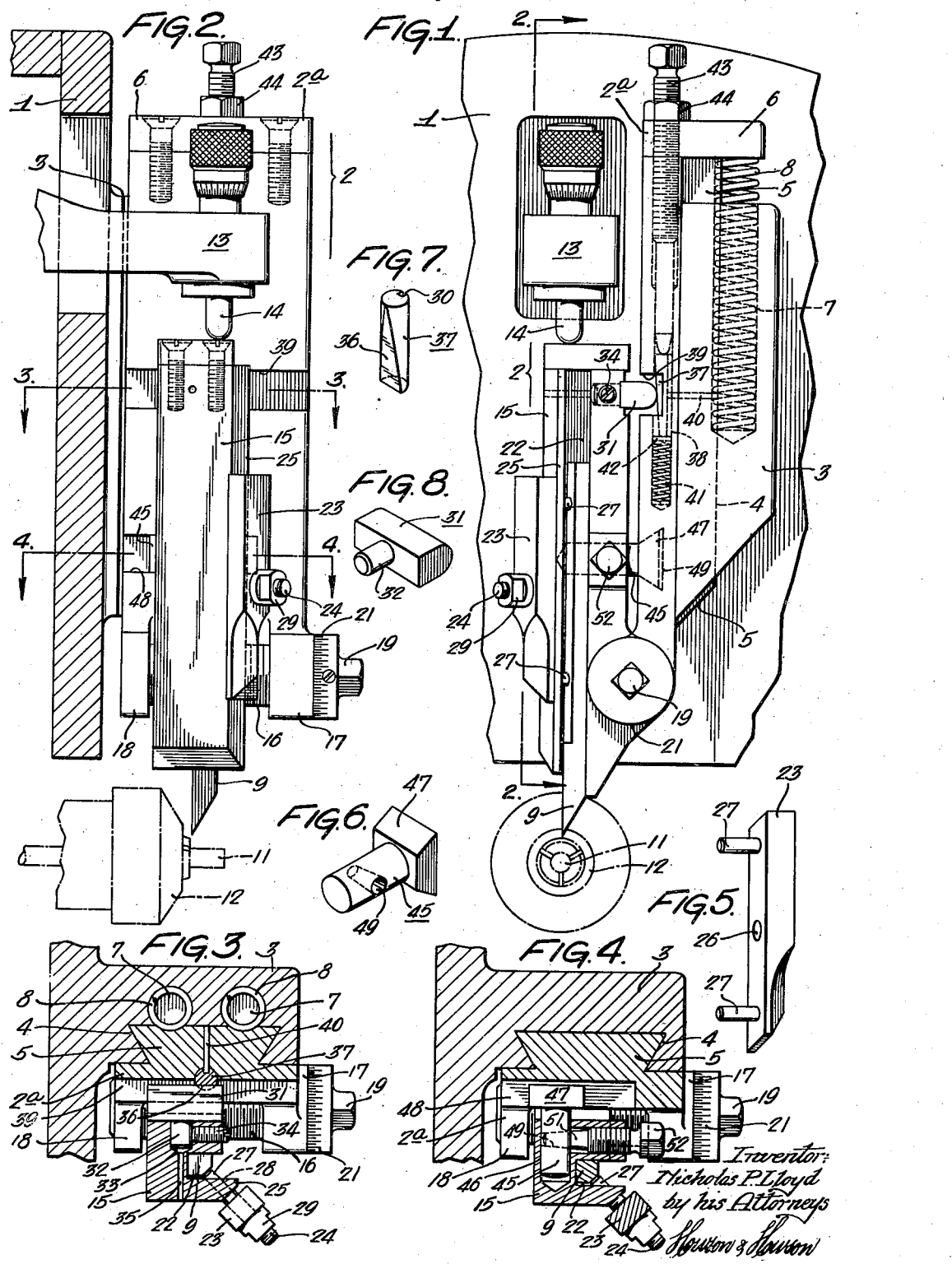

2,360,567

UNITED STATES PATENT OFFICE 2,360,567

TOOLHOLDER

Nicholas P. Lloyd, Wynnewood, Pa.

Application May 5, 1942, Serial No. 441,849

8 Claims. (Cl. 82—36)

This invention relates to tool carriers for machine tools, and more particularly to carriers of the type disclosed in my pending application Serial Number 383,634, now Patent No. 2,343,914, issued March 14, 1944.

A principal object of the present invention is to provide an improved carrier of the stated type, characterized by relative simplicity and accuracy of form and adjustment, all as hereinafter set forth and illustrated in the attached drawing, in which:

Figure 1 is a front elevational view of a carrier made in accordance with my invention;

Fig. 2 is a section on the line 2—2, Fig. 1;

Figs. 3 and 4 are, respectively, sectional views on the lines 3—3 and 4—4, Fig. 2, and Figs. 5, 6, 7, and 8 are views in perspective of certain of the elements of the carrier assembly.

With reference to the drawing, 1 indicates a base frame on which the carrier, designated generally by the reference numeral 2, is adjustably supported. In the present instance the frame 1 is provided with a projecting portion 3 having in one face thereof a dovetailed slot 4 which receives a dovetailed tongue 5 at the back of a carriage 2a constituting a major element of the carrier 2. By this means the carrier is slidably supported in the frame 1.

As shown in Figs. 1 and 3, the carriage 2a has at its upper end a flange 6 which projects rearwardly over the top of the member 3. This latter member is provided with two longitudinal recesses 7, 7 which extend downwardly from the upper end thereof, and these recesses are adapted to receive coiled springs 8, 8 which seat against the under side of the flange 6 and which resiliently support the carriage 2a in the guideway 4. As shown in Fig. 3, the recesses 7 intersect the bottom of the slot 4, and the rear face of the tongue 5 is grooved in line with each of the recesses 7 so as to complete the cylindrical form of the latter. The springs tend to retain the tool carrier in an elevated or retracted position wherein the tool 9 is withdrawn from the work. This is illustrated in Figs. 1 and 2, wherein the work piece 11, shown in broken lines, is supported in a collet 12. The carrier may be advanced against the pressure of the springs 8, so as to bring the tool into engagement with the work by means of a lever 13, which carries in the end thereof an adjustable element 14 for engagement with the upper end of a tool holder 15 of the carrier, as shown in Fig. 2, the lever 13 being connected with a suitable operating mechanism (not shown).

The tool 9 is supported in the holder 15 which is pivotally mounted upon a threaded element 16 rotatably supported in bosses 17 and 18 at the lower end of the carriage 2a. The element 16 may be turned in the bosses 17 and 18 by means of a wrench applied to the terminal end 19 of the screw, and a micrometer scale 21 is provided whereby angular movement of the screw may be accurately measured. The element 16 is threaded through the holder 15 so that the element functions not only as a pivotal support for the holder but also as a means for adjusting the holder axially of the element between the supporting bosses 17 and 18.

As shown in Figs. 1, 3 and 4, the tool 9 is seated in a longitudinal recess 22 in the holder, and is clamped in the recess by means of a clamping bar 23, see Fig. 5, and a clamping stud 24 which is fastened in a transverse flange 25 forming one wall of the recess 22, and is adapted to pass through an aperture 26 in the bar 23. The bar 23 carries two pins 27, 27 which extend through apertures 28 in the flange 25 and engage a side surface of the tool 9, see Figs. 3 and 4. A nut 29 on the outer end of the stud 24 may be tightened against the bar 23 to thereby cause the pins 27 to clamp the tool 9 in adjusted position in the slot 22. It is to be noted that the stud-receiving aperture 26 of the bar lies between the pins 27, 27 so that the pressure inserted through the nut 29 is transferred in substantially equal degree through the said pins to the tool. By loosening the single nut 29, the tool 9 may be adjusted longitudinally in the slot 22 of its holder.

Secured in the upper end of the holder 15 is an element 31, preferably of hardened steel or the like, said element having projecting from one side thereof a pin 32 which fits into a cylindrical recess 33 in the rear face of the holder and which is fastened in said recess by means of a set screw 34, see Fig. 3. A small bore 35 extends from the bottom of the recess 33 to the outer face of the holder, also as shown in Fig. 3. The element 31 is adapted to bear against an inclined face 36 of a wedge element 37, see Fig. 7, this element being adjustably supported, as shown in Fig. 1, in a bore 38 which extends downwardly from the top of the carriage 2a. The bore 38 is intersected by a recess 39 in which the wedge element 37 is exposed for engagement with the element 31, see Figs. 1 and 3. In the bottom of the bore 38 is a coiled spring 41 which through the medium of a washer 42 resiliently supports the wedge element 37 in the bore 38, and the wedge element may be adjusted downwardly in the bore against the pressure of the spring 41 by an adjusting screw 43, threaded into the outer end of the bore and engaging the top of the said wedge element. A lock nut 44 retains the screw 43 locked in adjusted position; and a pin 40 mounted in a bore in the carriage, see Figs. 1 and 3, fits into a slot 30 at the back of the wedge 37 and prevents the wedge from turning in the bore 38. It is apparent that the wedge element 37, acting through the element 31, controls the angular position of the holder 15 on the pivot screw 16, and that this angular position may be regulated by adjustment of the wedge 37 in the bore.

In order to clamp the holder tightly in adjusted position, both as to the aforesaid angular adjustment about the axis of the screw 16 and the adjustment axially of the screw, a locking device is provided comprising an anchor pin 45, which fits into a bore 46 in the holder, as shown in Fig. 4, and which has a dovetailed head 47 fitting slidably in a correspondingly dovetailed transverse recess 48 in the carriage 2a. The pin 45 is provided with a tapered aperture 49 which receives the tapered extremity 51 of a screw 52 threaded into the holder 15, the arrangement being such that when the screw 52 is turned inwardly so as to advance the tapered end 51 in the aperture 49 of the pin 45, a wedging action takes place which tends to draw the pin outwardly and to force the upper end of the holder inwardly against the wedge element 37. The further the screw 52 is turned in the tighter is the clamping action. After adjustment of the wedge 37, therefore, to angularly adjust the holder on the pivot element 16, the holder may be clamped solidly in place by merely tightening the locking screw 52.

I claim:

1. In a tool carrier, a pivotally mounted tool holder, an adjustable wedge forming an abutment for the holder, a spring engaging one end of the wedge, means for adjusting the wedge against the tension of said spring to thereby regulate the angular position of the holder on the pivot, and means for clamping the holder against the wedge.

2. In a tool carrier, a pivotally mounted tool holder, a wedge operatively engaged with said holder and adjustable to regulate the angular position of the holder on the pivot, a spring exerting pressure tending to move the wedge in one direction, an adjusting screw for moving the wedge in the opposite direction against the pressure of the spring, and means for solidly clamping the holder against the wedge.

3. In a tool carrier, a pivotally mounted tool holder, means for adjusting the holder angularly about the pivot, and means for clamping the holder in adjusted position, said clamping means comprising an anchor pin slidably engaged with said holder and having a transverse tapered opening, and a locking screw threaded into said holder and having a tapered extremity for engagement in the tapered recess of the pin to thereby rigidly lock the holder in position.

4. In a tool carrier, a pivotally mounted tool holder, an adjustable element engaging said holder for regulating the angular position of the holder on the pivot, and clamping means for said holder, said clamping means comprising a relatively fixed anchor pin projecting in a direction transverse to the axis of the pivot and having therein a transverse tapered opening, and a locking screw threaded into said holder in parallel relation to the said axis and having a tapered extremity for wedging engagement in said tapered aperture.

5. In a tool carrier, a pivotally mounted tool holder, means operatively connected with said holder for adjusting the holder angularly about the axis of said pivot and also axially of said pivot, and means for anchoring the holder in adjusted position, said means comprising an anchor pin extending in a direction transverse to the said pivotal axis and bodily adjustable in the direction of said axis, said pin having a tapered aperture therein, and a locking screw threaded into said holder and having a tapered extremity for interlocking engagement with said tapered aperture.

6. In a tool carrier, a supporting member, a tool holder pivotally mounted in said member, means for adjusting the holder both angularly about and axially of said pivot, and means for clamping the holder in adjusted position, said means comprising an anchor pin slidably mounted in said support for bodily adjustment axially of the pivot, said anchor pin projecting toward the holder in a direction transverse to said axis, a transverse tapered recess in said pin, and a locking screw threaded into the holder in parallel relation to said axis and having a tapered end for interlocking engagement with said aperture.

7. In a tool carrier, the combination with a tool holder having a tool-receiving recess and a seat in said recess with relatively fixed angularly disposed surfaces adapted to engage adjoining faces of the tool and to thereby establish a predetermined position for the tool in the holder, a stud projecting from said holder, a clamping bar supported on said stud and having pins extending into end abutting engagement with one side of a tool seated in the recess, and a nut on said stud for locking the bar in tool-clamping position on the stud, said stud extending in such direction with respect to the said surfaces of the seat that when the nut is tightened the said pins are caused to exert pressure on the tool to force the tool solidly against both of said surfaces.

8. In a tool carrier, a holder having a tool-receiving recess in which the said tool is seated for longitudinal adjustment, said seat having tool-engaging surfaces arranged to establish a predetermined lateral position for the tool in the holder, a clamping bar having pins projecting through a wall of said recess into end-abutting relation with one side of the tool, a stud on said holder projecting through an aperture in said bar, said aperture being intermediate the pins, and a nut upon said stud for pressure engagement with the bar to force the pins into clamping engagement with the tool, said stud extending in such direction with respect to the said surfaces of the seat that when the nut is tightened the said pins are caused to exert pressure on the tool to force the tool solidly against both of said surfaces.

NICHOLAS P. LLOYD.